United States Patent
He

(10) Patent No.: US 9,111,163 B2
(45) Date of Patent: Aug. 18, 2015

(54) APPARATUS FOR AND METHOD OF ELECTRO-OPTICALLY READING A SELECTED TARGET BY IMAGE CAPTURE FROM A PICKLIST OF TARGETS

(71) Applicant: SYMBOL TECHNOLOGIES, INC., Schaumburg, IL (US)

(72) Inventor: Duanfeng He, South Setuaket, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 146 days.

(21) Appl. No.: 13/955,416

(22) Filed: Jul. 31, 2013

(65) Prior Publication Data

US 2015/0034724 A1    Feb. 5, 2015

(51) Int. Cl.
  *G06K 7/14*    (2006.01)
(52) U.S. Cl.
  CPC .................................. *G06K 7/1443* (2013.01)
(58) Field of Classification Search
  USPC ................. 235/462.08, 462.16, 437
  See application file for complete search history.

(56) References Cited

U.S. PATENT DOCUMENTS

| | | | | |
|---|---|---|---|---|
| 5,262,623 | A | * | 11/1993 | Batterman et al. ............ 235/454 |
| 6,070,801 | A | * | 6/2000 | Watanabe et al. ........ 235/462.16 |
| 6,729,544 | B2 | | 5/2004 | Naven |
| 7,121,469 | B2 | * | 10/2006 | Dorai et al. .................... 235/470 |
| 7,137,556 | B1 | * | 11/2006 | Bonner et al. ............ 235/462.08 |
| 2004/0035925 | A1 | * | 2/2004 | Wu et al. ........................ 235/380 |
| 2006/0118635 | A1 | * | 6/2006 | Joseph et al. ............ 235/462.24 |
| 2009/0057411 | A1 | * | 3/2009 | Madej et al. ............. 235/462.11 |
| 2009/0283598 | A1 | * | 11/2009 | Sherman ....................... 235/404 |
| 2011/0073657 | A1 | | 3/2011 | Trajkovic et al. |
| 2012/0067943 | A1 | * | 3/2012 | Saunders et al. ............. 235/375 |
| 2013/0026236 | A1 | | 1/2013 | Goren |
| 2013/0075464 | A1 | * | 3/2013 | Van Horn et al. ............. 235/375 |

FOREIGN PATENT DOCUMENTS

| | | |
|---|---|---|
| WO | 2005050390 A2 | 6/2005 |
| WO | 2010040044 A2 | 4/2010 |
| WO | 2010040044 A3 | 4/2010 |

* cited by examiner

*Primary Examiner* — Allyson Trail
(74) *Attorney, Agent, or Firm* — Nong-Qiang Fan

(57) ABSTRACT

A selected target from a picklist having a plurality of targets is electro-optically read, by image capture, over a range of working distances, by capturing an image of the picklist in the range over an imaging field of view, by storing coordinates of a trajectory of an aiming light pattern in the imaging field of view over the range, by processing the captured image along the trajectory to find and identify a target, by determining whether the target covers the trajectory, and by determining that the target is the selected target when the target at least partially covers the trajectory.

17 Claims, 6 Drawing Sheets

APPARATUS FOR AND METHOD OF ELECTRO-OPTICALLY READING A SELECTED TARGET BY IMAGE CAPTURE FROM A PICKLIST OF TARGETS

FIELD OF THE DISCLOSURE

The present disclosure relates generally to an apparatus for, and a method of, electro-optically reading a selected target, by image capture, from a picklist of targets contained in an imaging field of view.

BACKGROUND

Solid-state imaging systems or imaging readers have been used, in both handheld and/or hands-free modes of operation, in supermarkets, warehouse clubs, department stores, and other kinds of retailers and other businesses for many years, to electro-optically read, by image capture, targets, such as one- and/or two-dimensional bar code symbols, each bearing elements, e.g., bars and spaces, of different widths and reflectivities, to be decoded, as well as other targets or forms, such as documents, labels, receipts, signatures, drivers' licenses, employee badges, payment/loyalty cards, and the like, each form bearing alphanumeric characters and/or graphics and/or symbols, to be imaged and processed.

A known exemplary imaging reader includes a housing held by a user, a window supported by the housing and aimed at the target by the user, and a scan engine or imaging module supported by the housing and having a solid-state imager (or image sensor) with a sensor array of photocells or light sensors (also known as pixels), and an imaging lens assembly for capturing return light scattered and/or reflected from the target being imaged along an imaging axis through the window over an imaging field of view, and for projecting the return light onto the sensor array to initiate capture of an image of the target over a range of working distances in which the target can be read. Such an imager may include a one- or two-dimensional charge coupled device (CCD) or a complementary metal oxide semiconductor (CMOS) device and associated circuits for producing and processing electrical signals corresponding to a one- or two-dimensional array of pixel data over the field of view. These electrical signals are decoded and/or processed by a programmed microprocessor or controller into information related to the target being read, e.g., decoded data indicative of a symbol, or into a picture indicative of a form. In the handheld mode of operation, the user holds the housing in his or her hand at a certain working distance from the target to be imaged, aims the window at the target, and manually activates a trigger on the housing to initiate a reading session.

In order to increase the amount of the return light captured by the imager, especially in dimly lit environments and/or at far range reading, the imaging module generally also includes an illuminating light assembly for illuminating the target with illumination light for reflection and scattering therefrom. The illumination light preferably is distributed along an illumination pattern over and along the target. The distributed illumination pattern is typically generated by using a pair of spaced-apart light emitting diodes (LEDs) and a pair of cylindrical lenses.

Since the user of the imaging reader cannot see exactly whether a target is located entirely within the imaging field of view of the imager, or know whether the target is optimally centrally located within the imaging field of view, the imaging module also typically includes an aiming light assembly for projecting a visible aiming light pattern, for example, a generally circular spot, or a cross-hairs, for placement at or near the center of the target, or an aiming line, or a series of generally circular spots linearly spaced apart, for placement lengthwise along the target, to assist the user in visually locating the target within the imaging field of view and, thus, advise the user in which direction the housing is to be moved in order to accurately position the aiming light pattern on the target prior to reading. The aiming light assembly includes an aiming light source, such as one or more LEDs and aiming lenses, or a laser and a pattern shaping optical element, such as a diffractive optical element (DOE), or a refractive optical element (ROE). The focused light passing through a respective DOE forms multiple diverging beamlets, which project continuous lines or rows of spots arrayed in the aiming light pattern on the target to indicate the imaging field of view.

Such known imaging readers are often operated to read symbol targets on picklists. A picklist is typically a document or a display screen on which many symbol targets are printed or displayed, each symbol target corresponding to an item to be managed. The items can identify physical items, such as food, materials, equipment, component parts, and like products in inventory, as well as abstract items, such as time, information, equipment settings, and the like. Such items are managed in many fields, such as material handling, production, packaging, inventory, transportation, warehousing, information flow, and security, just to name a few. The imaging reader is operated to read a selected symbol target from the many symbol targets on the picklist, thereby automatically identifying the corresponding item to a remote host computer for further processing and management.

Although the known imaging readers are generally sufficient for their intended purpose, they have sometimes proven to be less than satisfactory when operated to read symbol targets on the picklist. The symbol targets are generally printed or displayed closely adjacent one another on the picklist. The imaging field of view of the imaging reader diverges outwardly of the imaging reader over the range of working distances relative to the housing. The diverging imaging field of view often contains more than one symbol target, and this effect is exacerbated as the working distance between the target and the housing increases, with a concomitant increase in the size of the diverging imaging field of view. It is therefore often difficult to read just the one particular symbol target that is desired, especially at the far end of the range.

The art has addressed this issue by employing a picklist mode of operation, wherein two types of images of the picklist are captured each time that a symbol target is to be read. At least one image of the first type is captured with the aiming light pattern on the selected symbol target, i.e., with the aiming light assembly energized; and at least one image of the second type is captured without the aiming light pattern, i.e., with the aiming light assembly deenergized. The controller determines from the image of the first type which symbol target was the one selected, i.e., the one on which the aiming light pattern was present, and then, now knowing the location of the selected symbol target from the image of the first type, the controller only processes the selected symbol target from its determined location in the image of the second type.

While the number of images of the first type and the number of images of the second type may vary in each reading session, which starts from the time of trigger activation and ends with either a successful decode or a failed attempt to decode, there are generally at least one image of the first type and at least one image of the second type acquired, in the picklist mode of operation. Although the picklist mode of operation sometimes fails, decoding and reading of the selected symbol target are always delayed, thereby causing the reading performance of the imaging reader to sometimes be perceived as sluggish by the user. Having to take at least two different types of images of the picklist each and every time that a symbol target is to be read also imposes a processing burden on the controller.

Accordingly, there is a need to provide an apparatus for, and a method of, electro-optically reading a selected target, by image capture, from a picklist of targets contained in an imaging field of view, without having to take at least two different types of images of the picklist each and every time that a symbol target is to be read, and to render the reading performance more aggressive, and to ease the processing burden on the controller.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
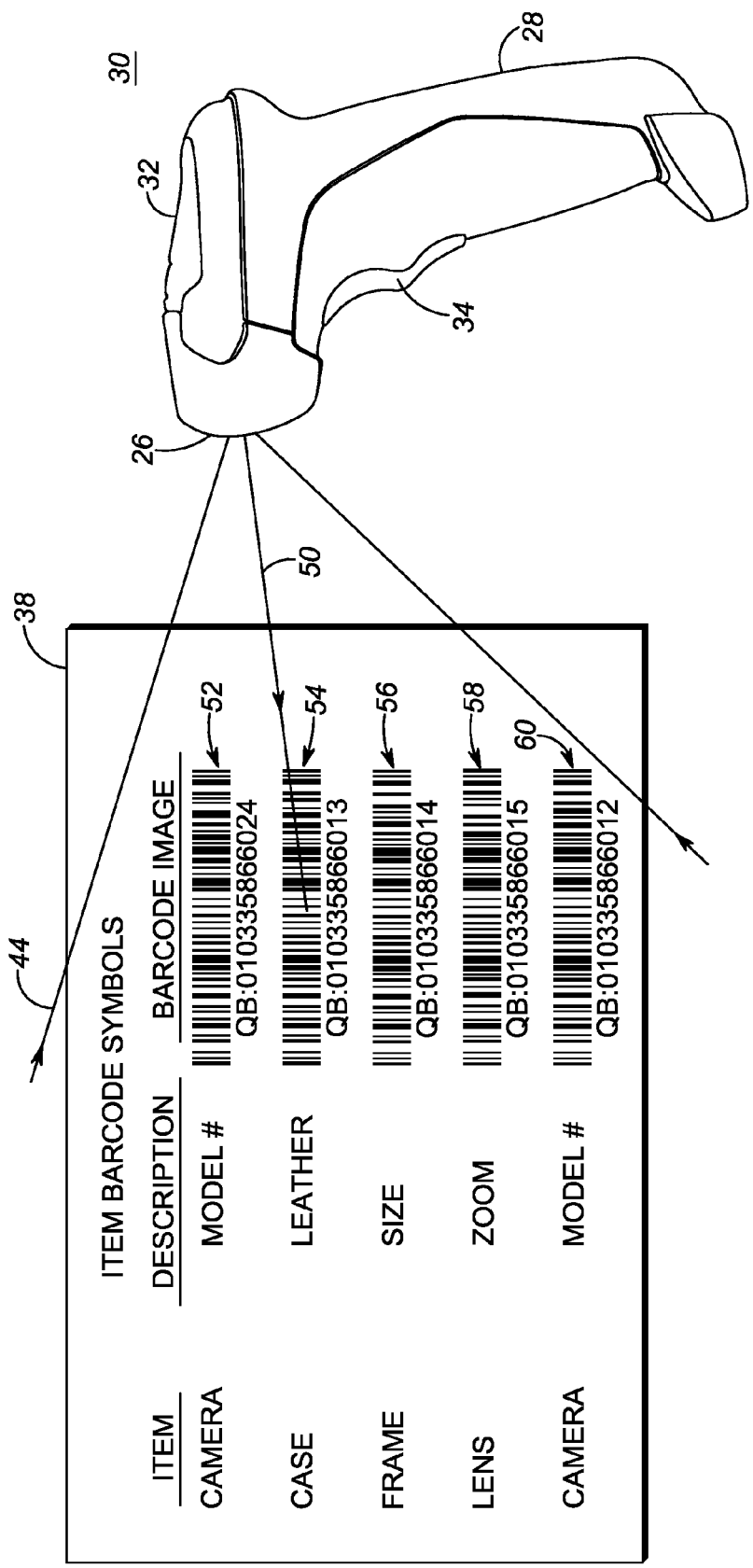
FIG. 1 is a side elevational view of a handheld imaging reader operative for electro-optically reading a selected target on a picklist of targets in accordance with the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One feature of the present disclosure resides, briefly stated, in an apparatus for electro-optically reading, by image capture, a selected target from a picklist having a plurality of targets over a range of working distances. The apparatus includes a housing, preferably a handheld housing; an imaging assembly, preferably including a solid-state imager having an array of image sensors supported by the housing, for capturing an image of the picklist in the range over an imaging field of view; a memory for storing coordinates of a trajectory of an aiming light pattern in the imaging field of view over the range; and a controller operatively connected to the memory, for processing the captured image along the trajectory to find and identify a target, for determining whether the target covers the trajectory, and for determining that the target is the selected target when the target at least partially covers the trajectory.

The apparatus advantageously includes an aiming light assembly that is energizable by the controller between an energized state in which the aiming light pattern is projected on the picklist, and a deenergized state in which no aiming light pattern is projected. A non-volatile portion of the memory stores two of the coordinates as end points of a line that defines the trajectory. In one embodiment, the controller determines that the target is the selected target when both the end points are located within the target, i.e., the target entirely covers the trajectory, in the deenergized state. In another embodiment, if the controller determines that the target only partially covers the trajectory, e.g., by determining that only one of the end points is located within the target, then the controller searches in a zone outside the target in the deenergized state, and determines that the target is the selected target when no other target is found in the zone. In still another embodiment, if the controller determines that another target is in the zone, then the controller energizes the aiming light assembly to the energized state, determines the location of the aiming light pattern and of the target on which the aiming light pattern is present, and determines that the target on which the aiming light pattern is present is the selected target.

In accordance with another aspect of the present disclosure, a method of electro-optically reading, by image capture, a selected target from a picklist having a plurality of targets over a range of working distances, is performed by capturing an image of the picklist in the range over an imaging field of view, storing coordinates of a trajectory of an aiming light pattern in the imaging field of view over the range, processing the captured image along the trajectory to find and identify a target, determining whether the target covers the trajectory, and determining that the target is the selected target when the target at least partially covers the trajectory.

Turning now to the drawings, reference numeral 30 in FIG. 1 generally identifies an ergonomic imaging reader configured as a gun-shaped housing having an upper barrel or body 32 and a lower handle 28 tilted rearwardly away from the body 32 at an angle of inclination, for example, fifteen degrees, relative to the vertical. A window 26 is located adjacent the front or nose of the body 32 and is preferably also tilted relative to the vertical. The imaging reader 30 is held in an operator's hand and used in a handheld mode in which a trigger 34 is manually depressed to initiate imaging of targets, especially bar code symbols on a picklist 38, to be read in a range of working distances relative to the window 26. Housings of other configurations can also be employed. As described below, an imaging field of view 44 diverges through the window 26 outwardly of the reader 30 onto the picklist 38, and an aiming light beam 50 is emitted from the reader 30 to help locate a target.

As described above, the picklist 38 of FIG. 1 is typically a document or a display screen on which many symbol targets 52, 54, 56, 58, 60 are printed or displayed in relatively close proximity to one another, each symbol target corresponding to a physical or abstract item to be managed. For example, as illustrated, the items are cameras and accessories therefor. The imaging reader 30 is operated to read a selected symbol target from the many symbol targets 52, 54, 56, 58, 60 on the picklist 38, thereby automatically identifying the corresponding item to a remote host computer for further processing and management.

Figure 2:
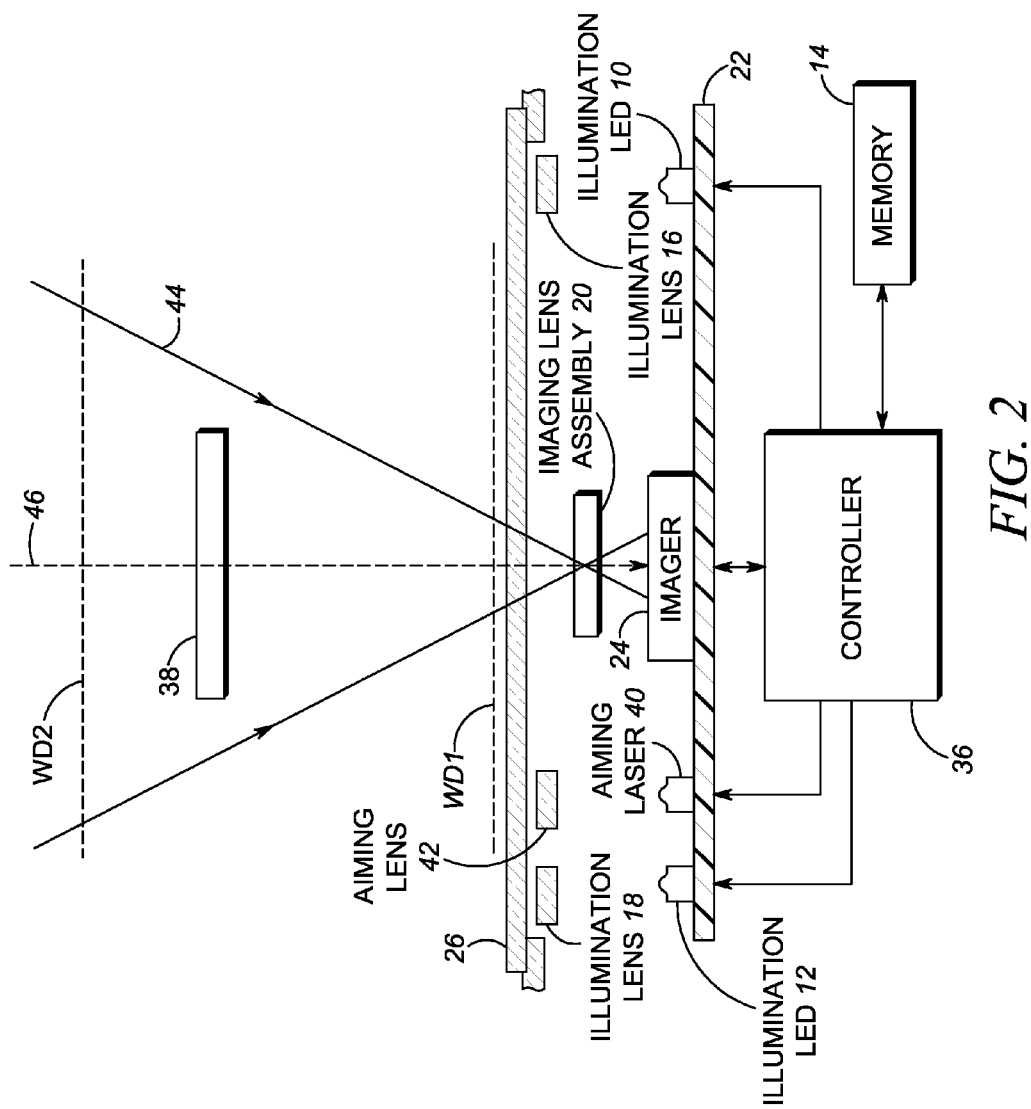
FIG. 2 is a schematic diagram of various components of the imaging reader of FIG. 1.

As schematically shown in FIG. 2, an imaging assembly includes an image sensor or imager 24 mounted on a printed circuit board (PCB) 22 in the reader 30. The PCB 22 is mounted within the tilted handle 28. The imager 24 is a solid-state device, for example, a CCD or a CMOS imager having a one- or two-dimensional array of addressable image sensors or pixels arranged in a single, linear row, or in mutually orthogonal rows and columns, and operative for detecting return light captured by an imaging lens assembly 20 along an imaging axis 46 through the window 26 over an imaging field of view 44 (FOV). The return light is scattered and/or reflected from the picklist 38 over the imaging FOV 44 that is generally perpendicular to the imaging axis 46.

The imaging lens assembly 20 is operative for focusing the return light onto the array of image sensors to enable the picklist 38 to be imaged. The picklist 38 may be located anywhere in a working range of distances between a close-in working distance (WD1) and a far-out working distance (WD2). In a preferred embodiment, WD1 is about one-half inch or less from the window 26, and WD2 is about 8 inches or more from the window 26.

An illuminating light assembly is also mounted in the imaging reader and includes an illumination light source, e.g., at least one light emitting diode (LED), and preferably a plurality of LEDs, such as a pair of illumination LEDs 10, 12 mounted on the PCB 22, and a pair of illumination lenses 16, 18 configured to generate a substantially uniform distributed illumination pattern of illumination light on and along the picklist 38 to be read by image capture. At least part of the scattered and/or reflected return light is derived from the illumination pattern of light on and along the picklist 38, the remainder being derived from ambient light.

Although in some applications, the illuminating light assembly itself can serve as an aiming aid, for the purpose of being able to operate in a picklist mode, a separate aiming light assembly is needed, so that the operator can use an aiming light pattern projected by the aiming light assembly to pick out one symbol target from among the many symbol targets, and so that the reader 30 can properly discern which of the symbol targets the operator intends to decode and read, using the aforementioned picklist mode of operation. The separate aiming light assembly is also mounted in the imaging reader, and includes an aiming light source 40, e.g., a laser or at least one light emitting diode (LED), also mounted on the PCB 22 and operative for emitting an aiming beam 50, and an aiming lens 42 for shaping the aiming beam 50 emitted by the aiming light source 40 to project an aiming light pattern on the picklist 38. The aiming pattern can be a generally circular aiming spot, or a cross-hairs, or a plurality of generally circular aiming spots, or an aiming line. A laser is preferred for the aiming light source 40.

As diagrammatically shown in FIG. 2, the imager 24, the illumination LEDs 10, 12 and the aiming light source 40 are operatively connected to a controller or programmed microprocessor 36 operative for controlling the operation of these components. The controller 36 energizes the aiming light assembly between an energized state in which the aiming light pattern is projected on the picklist, and a deenergized state in which no aiming light pattern is projected. A memory 14 having a non-volatile portion is connected and accessible to the controller 36. Preferably, the microprocessor 36 is also used for processing the electrical signals from the imager 24 and for processing and decoding the captured target images. The controller 36 and the memory 14 are advantageously mounted on the PCB 22.

In operation, the microprocessor 36 sends command signals to energize the illumination LEDs 10, 12 for a short exposure time period, say 500 microseconds or less, and to energize and expose the imager 24 to collect the return light, e.g., illumination light and/or ambient light, from the picklist 38 only during said exposure time period. A typical array needs about 18-33 milliseconds to acquire the entire target image and operates at a frame rate of about 30-60 frames per second.

Figure 3:
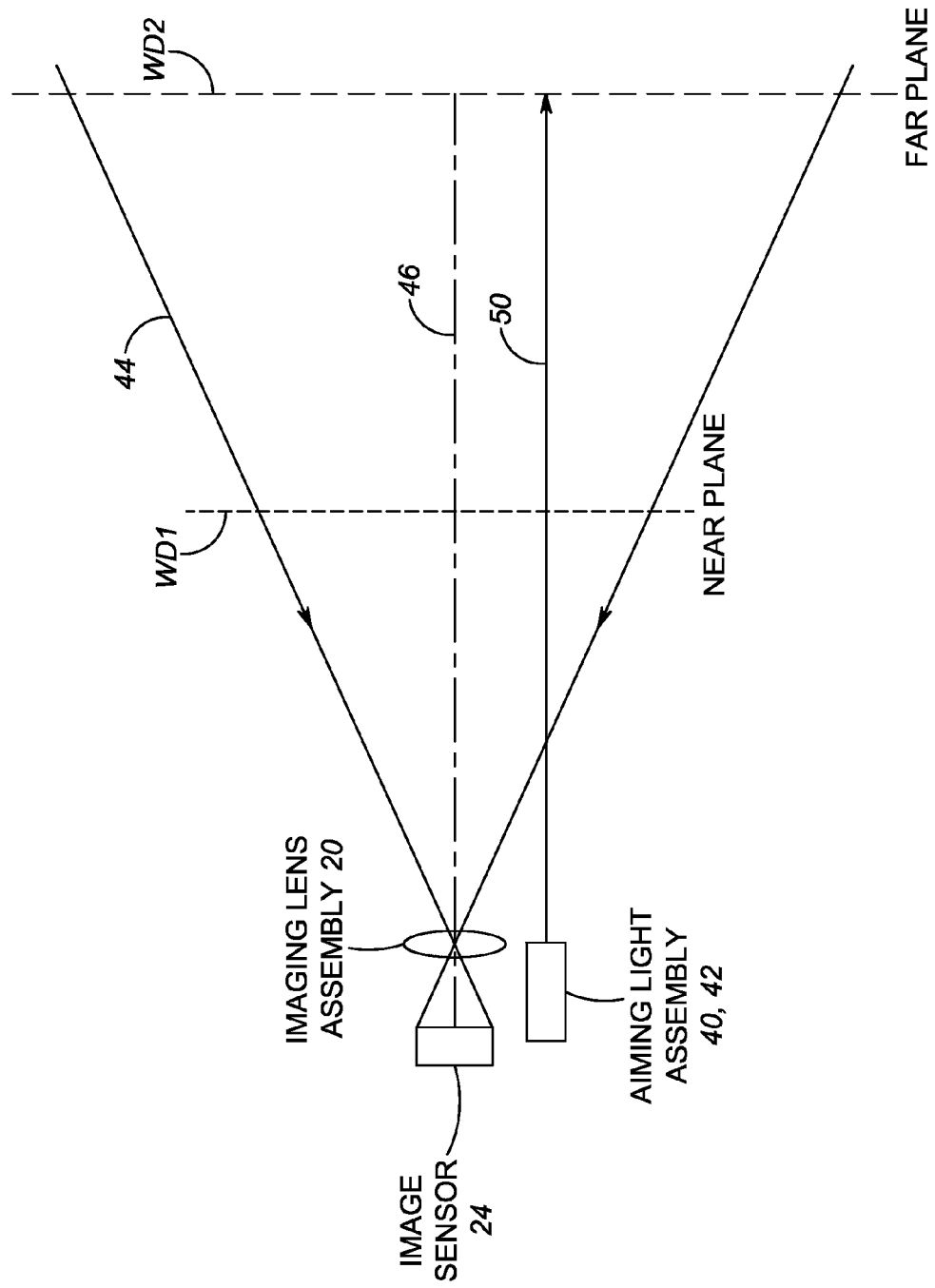
FIG. 3 is a schematic diagram of some of the components of FIG. 2 shown in isolation.

As previously described, the diverging imaging field of view 44 often contains more than one symbol target 52, 54, 56, 58, 60, as shown in FIG. 1, and this effect is exacerbated as the working distance between the picklist 38 and the reader 30 increases, with a concomitant increase in the size of the diverging imaging field of view 44, as depicted in FIG. 3. It is therefore often difficult to read just the one particular symbol target that is desired, e.g., target 54, especially if the picklist 38 is located at the far end of the range in FIG. 3.

Figure 4:
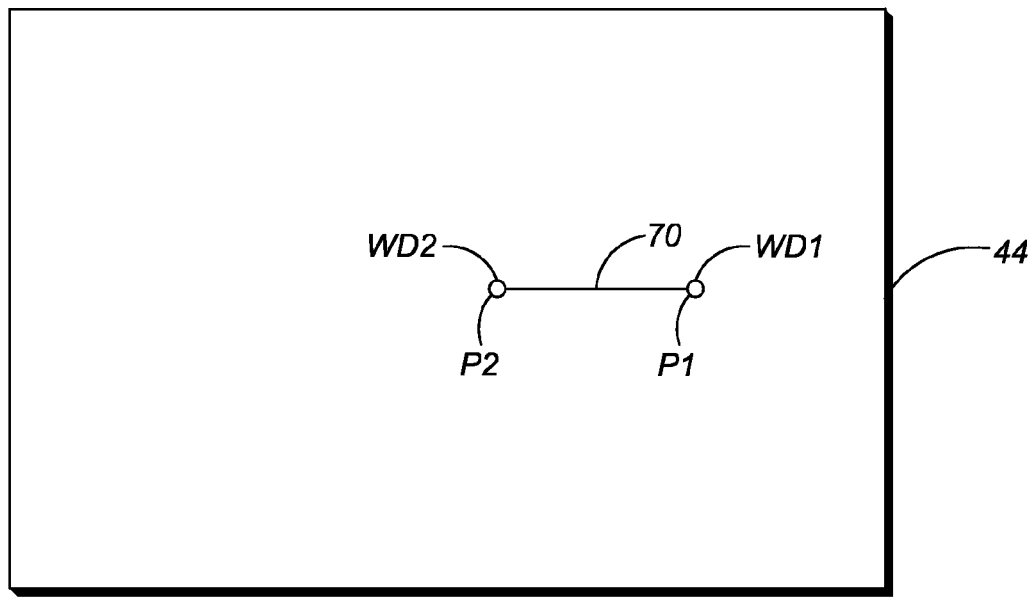
FIG. 4 is a plan view of a trajectory of aiming light patterns in an imaging field of view over a range of working distances.

In accordance with one aspect of the present disclosure, the memory 14 stores coordinates of a trajectory of an aiming light pattern in the imaging field of view 44 over the range. Preferably, the non-volatile portion of the memory 14 stores two of the coordinates as end points P1 and P2 of a line that defines a linear trajectory 70 depicted in FIG. 4. The point P2 corresponds to a light spot at the far working distance end WD2 of the range, and the point P1 corresponds to a light spot at the near working distance end WD1 of the range. The locus of points on the trajectory 70 between the points P1 and P2 represent the locations of the light spot at all the working distances between the working distances WD1 and WD2. The storage of the trajectory 70 is well defined and fixed for each reader 30. The trajectory 70 can be stored in advance during manufacture of the reader 30.

Figure 5:
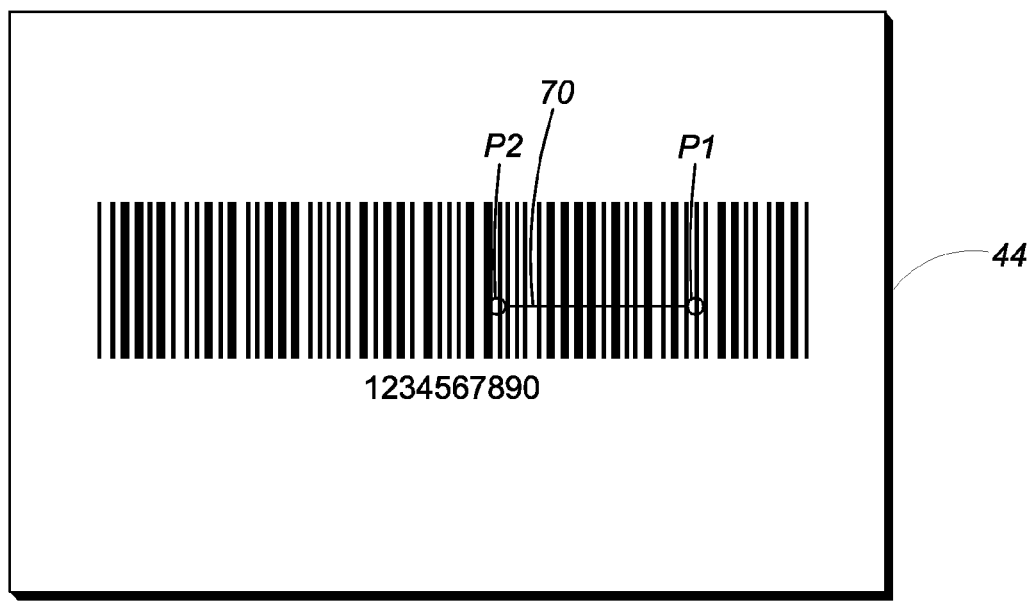
FIG. 5 is a plan view depicting a symbol target that covers the entire trajectory of FIG. 4.

In operation, the controller 36 processes the captured image of the picklist 38 along the trajectory 70 to find and identify a target, determines whether the target covers the trajectory 70, and determines that the target is the selected target when the target at least partially covers the trajectory 70. For example, as shown in FIG. 5, the symbol target entirely covers the trajectory 70, i.e., both of the points P1 and P2 are located within the symbol target. As described below, this determination is made in the deenergized state of the aiming light assembly.

Figure 6:
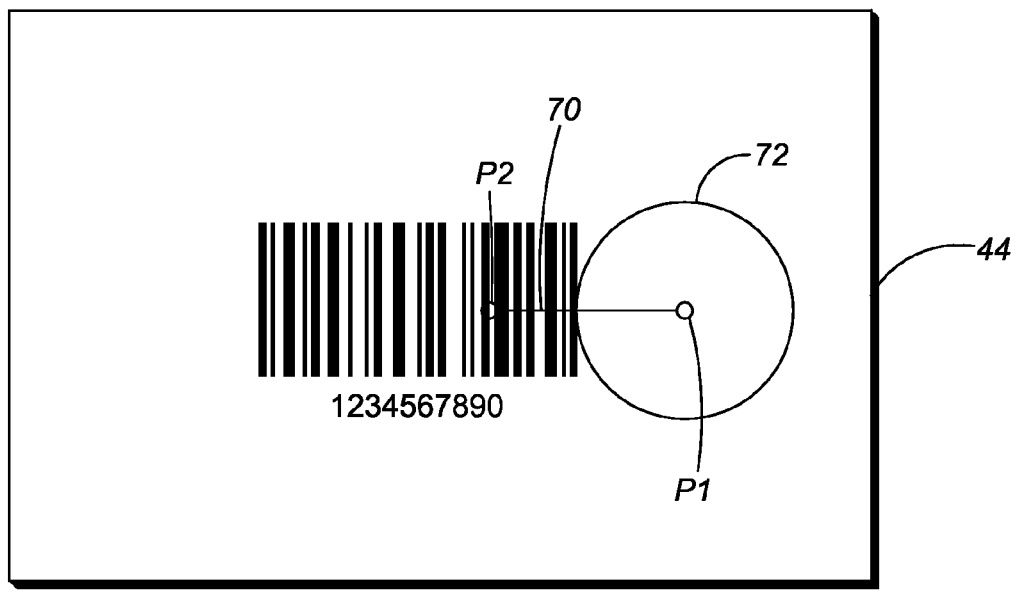
FIG. 6 is a plan view depicting a symbol target that only partially covers the trajectory of FIG. 4.

As described in detail below in connection with the flow chart of FIG. 7, if the controller 36 determines that the symbol target only partially covers the trajectory 70, as shown in FIG. 6, i.e., only one of the end points, e.g., point P2, is located within the symbol target, then the controller 36 searches in a zone 72 outside the symbol target, and determines that the symbol target is the selected target when no other target is found in the zone 70. Advantageously, the controller 36 configures the zone 72 as a circular area whose center is the other of the end points, i.e., point P1, and whose radius extends from the center point P1 to the outside edge of the symbol target. This determination is also made in the deenergized state of the aiming light assembly.

If the controller 36 determines that another target is located in the zone 72, then the controller 36 energizes the aiming light assembly 40, 42 to the energized state to project the aiming beam 50 and position an aiming light pattern on the picklist 38. The controller 36 determines the location of the aiming light pattern and of the target on which the aiming light pattern is present, and determines that the target on which the aiming light pattern is present is the selected target.

Figure 7:
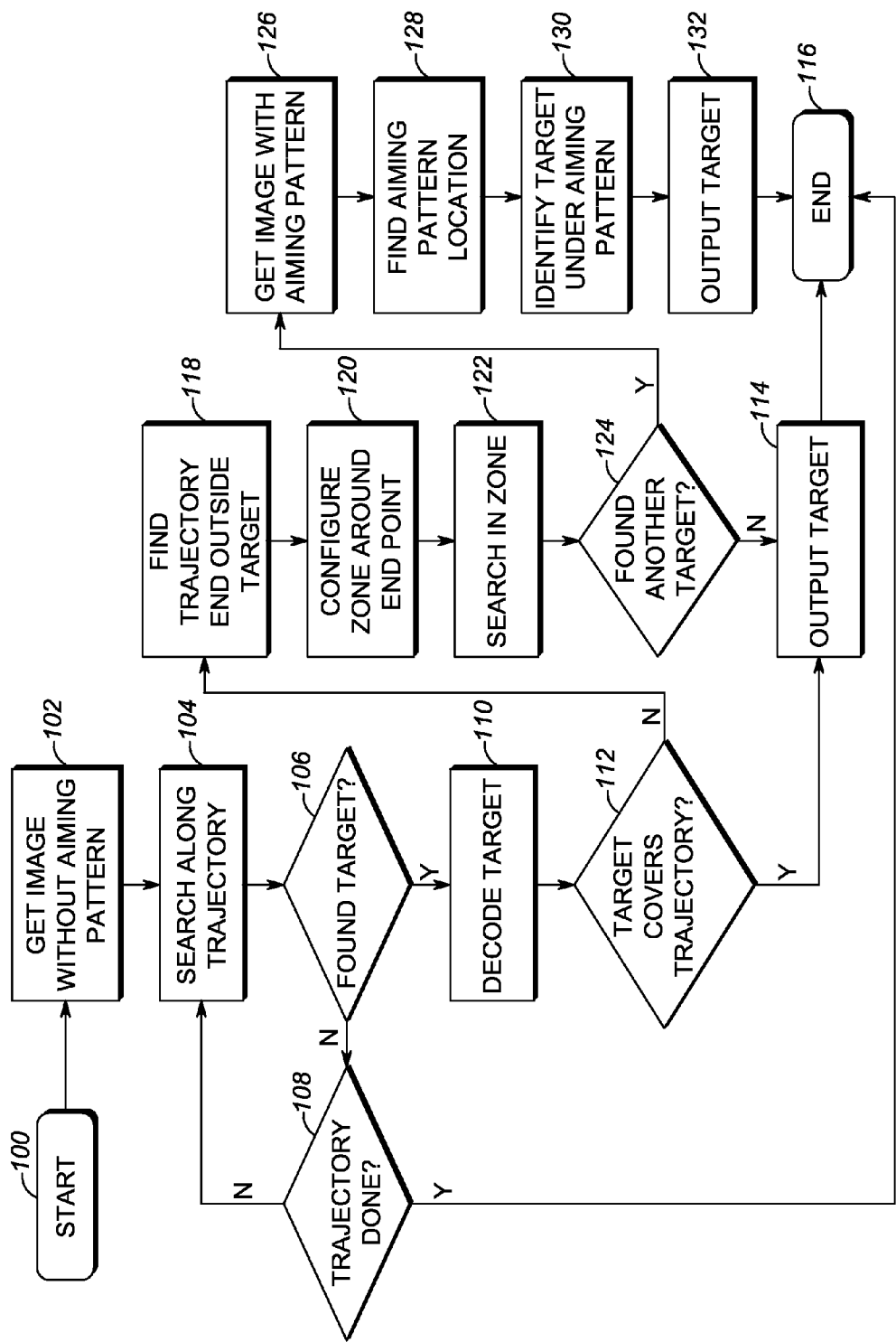
FIG. 7 is a flow chart depicting operation of a method in accordance with the present invention.

Turning to the operational flow chart of FIG. 7, a picklist reading session begins at start step 100. In step 102, capture of an image of the picklist 38 is performed without energizing the aiming light assembly 40, 42. This is in contrast to the known picklist mode of operation, wherein at least one image of the first type is captured with the aiming light assembly 40, 42 energized. This image capture is typically initiated by manually activating the trigger 34. Alternatively, the trigger could be activated automatically by operation of an object sensing assembly.

The controller 36 now analyzes the captured image by searching along the trajectory 70 in step 104, and determining if a symbol target can be found along the trajectory 70 in step 106. If not, then the controller 36 determines if the trajectory 70 is done in step 108. If not, then the controller 36 returns to the searching step 104. If the trajectory 70 is done, then the session is ended at end step 116. However, if the controller 36 determines that a symbol target can be found along the trajectory 70, then the controller 36 decodes the symbol target in step 110, and next determines whether or not the symbol target covers the entire trajectory 70 in step 112.

If the symbol target covers the entire trajectory 70, as exemplified by FIG. 5, then the decoded symbol target is output at step 114, and the session ends at step 116. Again, the selected target has been decoded without energizing the aiming light assembly 40, 42. However, if the symbol target only partially covers the trajectory 70, as exemplified by FIG. 6, then the controller 36 finds the outside end point P1 in step 118, and configures the zone 72, preferably by drawing a circle around the end point P1 in step 120. Next, the controller 36 searches in the zone 72 in step 122 to determine whether or not a symbol target is within the zone 72 in step 124. If no symbol target is located within the zone 72, then the symbol target containing the point P2 is indeed the selected target, and the selected target is output in step 114 and the session ends at step 116. Again, the selected target has been decoded without energizing the aiming light assembly 40, 42.

However, if a symbol target is located within the zone 72, then it is ambiguous whether the target inside the zone 72 belongs the target outside the zone, or to another symbol target on the picklist 38. In this case, resort is made to the aiming light assembly 40, 42. Thus, in step 126, capture of an image of the picklist 38 is performed with energizing the aiming light assembly 40, 42. Then, the controller 36 finds the aiming light pattern location in the captured image in step 128, and identifies the symbol target underneath the aiming light pattern in step 130. Now knowing the correct symbol target, the target is outputted at step 32, and the session ends at step 116.

In the foregoing specification, specific embodiments have been described. However, one of ordinary skill in the art appreciates that various modifications and changes can be made without departing from the scope of the invention as set forth in the claims below. For example, the apparatus described herein is not intended to be limited to a handheld electro-optical reader, but could be implemented as an auxiliary system in other apparatus, such as a computer or mobile terminal. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus for electro-optically reading, by image capture, a selected target from a picklist having a plurality of targets over a range of working distances, the apparatus comprising:
   a housing;
   an aiming light assembly energizable between an energized state in which an aiming light pattern is projected on the picklist, and a deenergized state in which no aiming light pattern is projected;
   an imaging assembly supported by the housing, for capturing an image of the picklist in the range over an imaging field of view;
   a memory for storing expected coordinates of a trajectory of the aiming light pattern in the imaging field of view over the range; and
   a controller operatively connected to the memory, for processing the captured image along the trajectory to find and identify a target, for determining whether the target covers the trajectory before the aiming light assembly is set to the energized state, and for determining that the target is the selected target when the target at least partially covers the trajectory.

2. The apparatus of claim 1, wherein the housing has a handle for handheld operation, and a trigger supported by the handle for activating the reading.

3. The apparatus of claim 1, wherein the imaging assembly includes a solid-state imager having an array of image sensors, and an imaging lens assembly for projecting the captured image onto the array.

4. An apparatus for electro-optically reading, by image capture, a selected target from a picklist having a plurality of targets over a range of working distances, the apparatus comprising:
   a housing;
   an imaging assembly supported by the housing, for capturing an image of the picklist in the range over an imaging field of view;
   a memory for storing coordinates of a trajectory of an aiming light pattern in the imaging field of view over the range;
   a controller operatively connected to the memory, for processing the captured image along the trajectory to find and identify a target, for determining whether the target covers the trajectory, and for determining that the target is the selected target when the target at least partially covers the trajectory;
   an aiming light assembly energizable between an energized state in which the aiming light pattern is projected on the picklist, and a deenergized state in which no aiming light pattern is projected; and
   wherein the memory stores two of the coordinates as end points of a line that defines the trajectory, and wherein the controller determines that the target is the selected target when both of the end points are located within the target in the deenergized state of the aiming light assembly.

5. An apparatus for electro-optically reading, by image capture, a selected target from a picklist having a plurality of targets over a range of working distances, the apparatus comprising:
   a housing;
   an imaging assembly supported by the housing, for capturing an image of the picklist in the range over an imaging field of view;
   a memory for storing coordinates of a trajectory of an aiming light pattern in the imaging field of view over the range;
   a controller operatively connected to the memory, for processing the captured image along the trajectory to find and identify a target, for determining whether the target covers the trajectory, and for determining that the target is the selected target when the target at least partially covers the trajectory; and
   wherein the memory stores two of the coordinates as end points of a line that defines the trajectory, and wherein the controller determines that the target is the selected target when one of the end points is located within the target in the deenergized state of the aiming light assembly.

6. The apparatus of claim 5, wherein the controller is further operative for searching in a zone outside the target when the one of the end points is located within the target, and for determining that the target is the selected target when no other target is found in the zone.

7. The apparatus of claim 6, wherein the controller is operative for configuring the zone as a circular area whose center is the other of the end points, and whose radius extends from the center to the target.

8. The apparatus of claim 6, wherein the controller is further operative for determining that another target is located in the zone, for energizing the aiming light assembly to the energized state, for determining the location of the aiming light pattern and of the target on which the aiming light pattern is present, and for determining that the target on which the aiming light pattern is present is the selected target.

9. An apparatus for electro-optically reading, by image capture, a selected target from a picklist having a plurality of targets over a range of working distances, the apparatus comprising:
   a handheld housing; an imaging assembly including a solid-state imager having an array of image sensors supported by the housing, for capturing an image of the picklist in the range over an imaging field of view;
   an aiming light assembly energizable between an energized state in which an aiming light pattern is projected on the picklist, and a deenergized state in which no aiming light pattern is projected;
   a memory for storing two end coordinates of an expected linear trajectory of the aiming light pattern in the imaging field of view over the range; and
   a controller operatively connected to the imaging assembly, the aiming light assembly, and the memory, for processing the captured image along the linear trajectory to find and identify a target before the aiming light assembly is set to the energized state, for determining that the target is the selected target when at least one of the end coordinates is located in the target and no other target is found in a zone outside the target in the deenergized state of the aiming light assembly, and for determining that the target is the selected target when the one of the end coordinates is located in the target and another target is found in the zone outside the target in the energized state of the aiming light assembly.

10. A method of electro-optically reading, by image capture, a selected target from a picklist having a plurality of targets over a range of working distances, the method comprising:
   projecting an aiming light pattern on the picklist in an energized state, and projecting no aiming light pattern in a deenergized state;
   capturing an image of the picklist in the range over an imaging field of view;
   storing expected coordinates of a trajectory of an aiming light pattern in the imaging field of view over the range;

processing the captured image along the trajectory to find and identify a target;

determining whether the target covers the trajectory before the aiming light assembly is set to the energized state; and determining that the target is the selected target when the target at least partially covers the trajectory.

11. The method of claim 10, and manually activating the reading.

12. The method of claim 10, wherein the capturing is performed by a solid-state imager having an array of image sensors, and by projecting the captured image onto the array.

13. A method of electro-optically reading, by image capture, a selected target from a picklist having a plurality of targets over a range of working distances, the method comprising:

capturing an image of the picklist in the range over an imaging field of view;

storing coordinates of a trajectory of an aiming light pattern in the imaging field of view over the range;

processing the captured image along the trajectory to find and identify a target;

determining whether the target covers the trajectory;

determining that the target is the selected target when the target at least partially covers the trajectory;

projecting an aiming light pattern on the picklist in an energized state, and projecting no aiming light pattern in a deenergized state; and wherein the storing is performed by storing two of the coordinates as end points of a line that defines the trajectory, and wherein the target is determined as the selected target when both of the end points are located within the target in the deenergized state.

14. A method of electro-optically reading, by image capture, a selected target from a picklist having a plurality of targets over a range of working distances, the method comprising:

capturing an image of the picklist in the range over an imaging field of view;

storing coordinates of a trajectory of an aiming light pattern in the imaging field of view over the range;

processing the captured image along the trajectory to find and identify a target;

determining whether the target covers the trajectory;

determining that the target is the selected target when the target at least partially covers the trajectory;

projecting an aiming light pattern on the picklist in an energized state, and projecting no aiming light pattern in a deenergized state; and wherein the storing is performed by storing two of the coordinates as end points of a line that defines the trajectory, and wherein the target is determined as the selected target when one of the end points is located within the target in the deenergized state.

15. The method of claim 14, and searching in a zone outside the target when the one of the end points is located within the target, and determining that the target is the selected target when no other target is found in the zone.

16. The method of claim 15; and configuring the zone as a circular area whose center is the other of the end points, and whose radius extends from the center to the target.

17. The method of claim 15, and determining that another target is located in the zone, determining the location of the aiming light pattern and of the target on which the aiming light pattern is present in the energized state, and determining that the target on which the aiming light pattern is present is the selected target.

* * * * *